United States Patent [19]

Prölss

[11] 4,177,228
[45] Dec. 4, 1979

[54] METHOD OF PRODUCTION OF A MICRO-POROUS MEMBRANE FOR FILTRATION PLANTS

[75] Inventor: Ludwig Prölss, Bellach, Switzerland

[73] Assignee: Kilcher-Chemie AG, Recherswil, Switzerland

[21] Appl. No.: 918,584

[22] Filed: Jun. 23, 1978

[30] Foreign Application Priority Data

Jul. 15, 1977 [CH] Switzerland ............... 8765/77

[51] Int. Cl.² .................................... B29D 27/04
[52] U.S. Cl. ........................ 264/24; 210/500M; 264/49; 264/108
[58] Field of Search ............ 264/49, 108, 41, 24, 264/53; 210/500 M

[56] References Cited

U.S. PATENT DOCUMENTS

| 2,467,214 | 4/1949 | Luaces | 264/49 X |
|---|---|---|---|
| 2,474,201 | 6/1949 | Raymond et al. | 264/49 X |
| 2,584,441 | 2/1952 | Fredendall | 264/108 X |
| 2,840,741 | 6/1958 | Lehmann | 264/24 X |
| 2,842,799 | 7/1958 | Politzer | 264/108 X |
| 2,887,601 | 5/1959 | Bain | 264/108 X |
| 2,983,960 | 5/1961 | Jilge | 264/49 X |
| 3,073,732 | 1/1963 | Hunsdiecker | 264/108 X |
| 3,220,960 | 11/1965 | Wichterle et al. | 264/49 X |
| 3,281,511 | 10/1966 | Goldsmith | 264/49 |
| 3,507,938 | 4/1970 | Hundsdiecker | 264/108 X |
| 3,524,768 | 8/1970 | Miyashita et al. | 264/49 X |
| 3,642,668 | 2/1972 | Bailey et al. | 264/41 X |
| 3,700,380 | 10/1972 | Kitrilakis | 264/49 X |
| 3,836,423 | 9/1974 | Wagner | 264/53 X |
| 3,855,122 | 12/1974 | Bourganel | 264/41 X |
| 3,867,299 | 2/1975 | Rohatgi | 264/24 X |

FOREIGN PATENT DOCUMENTS 727679 4/1955 United Kingdom ............ 264/49
1331775 9/1973 United Kingdom .

*Primary Examiner*—Philip Anderson
*Attorney, Agent, or Firm*—Wender, Murase & White

[57] ABSTRACT

A method for production of a micro-porous membrane for filtration plants, whereby finely distributed particles are mixed and aligned in a plastics material or a preliminary plastics material product and are insoluble therein, the particles are then dissolved out after reaching the final mould position; said insoluble particles mixed into the plastics material or preliminary plastics material product being aligned in a liquid state in the pores of a coarse pored support membrane at right angles to the membrane surface.

15 Claims, 8 Drawing Figures

METHOD OF PRODUCTION OF A MICRO-POROUS MEMBRANE FOR FILTRATION PLANTS

BACKGROUND OF THE INVENTION

The present invention relates to a method for producing a micro-porous diaphragm or membrane for filtration plants, whereby finely distributed, insoluble particles are mixed and aligned in a plastics material or previously produced or primary plastics material product and are dissolved out on the final position. Such diaphragms or membranes are suitable for ultra filtration of aqueous media, for reverse osmosis and dialysis.

There is generally understood by the term "ultra filtration" the separation of colloidal particles with moderate excess pressure, whilst by reverse osmosis there is understood the separation of substantially smaller, truly dissolved particles at high pressure from the solvent or increasing the concentration of dissolved particles in a solvent.

The membrane forms the core member of a filtration plant. Its properties also determine whether the plant is sufficiently efficient and competitive. A perfect membrane should have the following properties:

(1) it should have, with a moderate charge pressure, a possibly high filter performance (Definition: cm$^3$ filtrate/cm$^2$/bar/hr., temperature);

(2) it should have an as uniform as possible width of pores with a sharp upward and downward definition—excessively narrow pores impair the filter performance whilst excessively wide pores lead to the escape of undesired particles;

(3) the pores should be as smooth as possible (capillary structure) and lead towards the filter surface with a sharp-edge (such membranes have a low pressure loss and are less prone to blockages);

(4) the membrane should be constant over a wide pH range. The membrane should not be subjected to microbial reduction and should be inert to an as large as possible number of chemicals and be insensitive to increased working temperature, increased pressures and vibration;

(5) the membrane should be stored as dry as possible to prevent the filter performance from being reduced;

(6) since water absorption, polarity, and wetting angle of the membrane polymer affect the separation selectivity and the passage resistance, these should be freely selectable for the intended purpose;

(7) the membrane is to be producible in accordance with a method which is also perfectly controllable in the production scale and permits a close classification with a low waste quota.

Efficient membranes are known which generally comprise an asymmetrically built-up porous layer of plastics material, such as cellulose acetate, polyamide, polyacrylonitrile, etc. These are produced by pouring plastics material solutions of complex composition to form a layer, evaporating or precipitating the smooth close-pored "active" surface thus obtained and the layer located directly beneath formed by coagulation with suitable media into a relatively coarse-pored support layer. Such membranes are at present at a high state of development and their possible disadvantages involving pore width, pore width distribution and thickness of the active layer are subjected to a plurality of influences certain only of which are now listed, namely:

the type and concentration of the polymer,
the type and concentration of the expanding agents,
the type and concentration of the solvents,
the type and concentration of the precipitating agent,
the degree of maturity of the solution,
the layer thickness, temperature, air moisture, air velocity and tempering or curing temperature.

Moreover the number of polymers which are suitable for producing asymmetrical membranes is limited. The manufacturer is therefore not necessarily in a position to provide a membrane substance which on account, for example, of the required chemical resistance, wetting ability and mechanical properties is best suited for the intended purpose.

Filter layers are known, which are produced by limited sintering (firing) of metal ceramics, carbon or polymeric material powders.

Frequently the side of a membrane facing the filtrate is also provided with a fine-pored sinter or suspension layer (so called composite or laminate membranes). Such membranes do not optimally conform to the aforesaid requirements either because the flow line of an imaginary liquid particle is considerably reticulated by the separating layer thus causing a high flow resistance.

British patent specification No. 1,331,775 discloses a method of producing porous polytetrafluoroethylene strips in which metal or glass fibres are admixed with a plastics material and moulded into ingots by pressure and wherein the fibres are aligned radially at right angles to the direction of pressure. A thin sheet is obtained by a peeling action and the fibres in the sheet, aligned substantially at right angles to the sheet surface, are then washed out. The peeling phase in particular is difficult to carry out and too costly for industrial production of the initially mentioned micro-porous membrane.

An object of the present invention is to produce a microporous membrane which fulfils the aforesaid conditions and does not contain the disadvantages described of the prior art membranes.

SUMMARY OF THE INVENTION

According to the present invention there is provided a method for production of a micro-porous membrane for filtration plants, whereby finely distributed particles are mixed and aligned in a plastics material or a preliminary plastics material product and are insoluble therein, the particles are then dissolved out after reaching the final mould position; said insoluble particles mixed into the plastics material or preliminary plastics material product being aligned in a liquid state in the pores of a coarse pored support membrane at right angles to the membrane surface.

BRIEF DESCRIPTION OF THE DRAWINGS

The invention will be described further, by way of example, in the embodiments contained in the accompanying drawings, in which.

DESCRIPTION OF THE PREFERRED EMBODIMENT

Finely powdered solid particles in high concentration are added to the plastics material in a dry state by an extrusion, mixing rolling mill or in a wet state by stirring into plastics material solutions or into low-molecular weight preliminary plastics material products, i.e. polymer precursors. The particles are subsequently caused to form structures whilst the plastics material proportion is still plastic or flowable. The plastics material is then brought into the final form, hardened and the particle proportion removed by etching or dissolution.

The particles have to fulfill the following requirements:

(1) their concentration has to lie close to a proportion of polymer material and to one part filler substances, and they should make contact with one another in the polymer;
(2) they have to be finely graded having a narrow grain size distribution and have a substantially round or rod-shaped structure;
(3) they have to be insoluble in the plastics material or the solvent used;
(4) they should be alignable in the polymer material by the methods mentioned below;
(5) they should be extractable by water, acids or other agents.

After the extraction process, cavities filled with air or water are left in place of the original particles, and the cavities are interconnected by spherical segments and, subject to the alignment method, permeate the membrane to form a passage more or less at right angles to the surface of the membrane.

Figure 1:
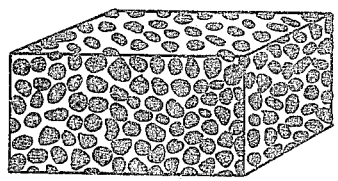
FIGS. 1 and 2 are schematic illustrations of two process steps for producing a reverse sinter layer.
Figure 2:
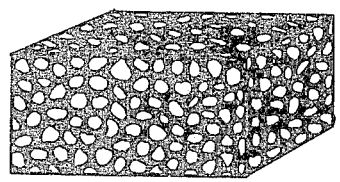

If during the manufacture of the membrane the alignment operations are omitted, then a film remains after extraction having a structure which is pre-shaped by hexagonal dense spherical pack and when viewed under a microscope is similar to solid foam sheet. This film may be designated as a reverse sinter layer because the structure is similar to a sintered plate but with the one difference in that identical cavities are present in place of the solid particles as is shown in FIGS. 1 and 2. The particles may be finely ground water soluble salts although in most cases, however, such salts are too soft and hence exhibit an excessively wide grain size and correspondingly wide pore width spectrum. Consequently, the resulting membranes may be inadequate for the intended uses.

It is preferable instead to use pyrolytically obtained silicon dioxide, aluminium oxide or titanium oxide. These substances are finely divided with substantially spherical particles of close grain size distribution and are obtainable in defined grain sizes and are extractable by hydrofluoric acid. Other particles (fillers) produced by precipitation or grinding may, however, be used. Of particular significance are ferro-magnetic fillers such as iron oxide II/III, iron powder, nickel powder, chromium-II/III-oxide.

The filter output of the so-called reverse sinter layer is not quite satisfactory. Because its structure is more like a micro-foam than a capillary layer, and the rate of flow—relative to the width of pore—is to be considered as average. To increase the rate it is necessary for the particles in the substrate to be so aligned before setting that they form capillary or flow structures at right angles to the membrane surface and are exposed by etching.

Structure formation is possible in many ways, for example:

(a) Flow line formation by directed wiping operations

Figure 5:
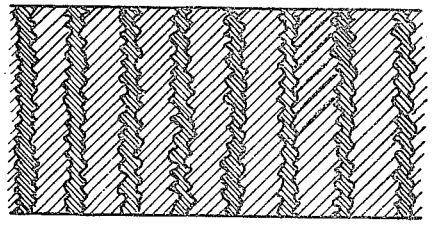
FIGS. 5 to 7 are schematic illustrations of three process steps in accordance with the invention by way of sectional views of a membrane.
Figure 6:
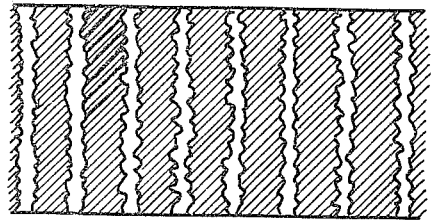
Figure 7:
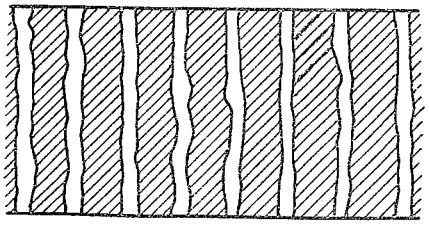

If a polymer material particle composition which is characterised by a distinct structure-viscous flow behaviour, is pressed onto a porous support medium or carrier layer, then the required capillary structures are developed by laminar flow action in the relatively coarse-pored cavities and such structures are subsequently etched out. The structure-viscous (pseudo-plastic) behaviour of the coating composition is important to retain bubble chain structure formed during the impressing and also during the subsequent drying operation. Subsequent etching with a different agent permits the diameter of the capillaries to be dilated, to be made smoother and to be brought to a required dimension, see FIGS. 5 to 7.

Figure 3:
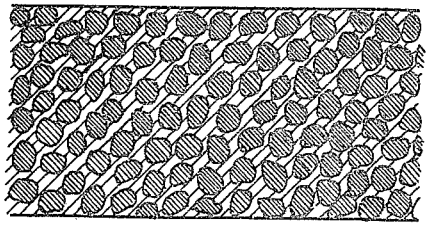
FIGS. 3 and 4 are schematic illustrations of two process steps in accordance with the invention by way of sectional views of a membrane.
Figure 4:
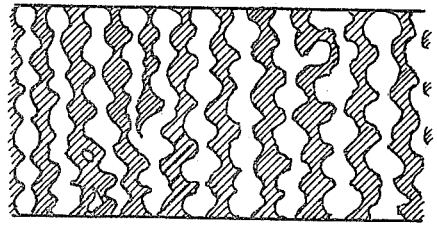

(b) Flow etching of reverse sinter layers (FIGS. 3 and 4)

A reagent which is able to erode the plastics material is flushed through the membrane under pressure. An important feature is a definite flow velocity during the etching operation so that the protruding, sharp-edged, thin walled bubble edges are preferably thereby eroded and parallel flow structures are formed. Better flow efficiency is achieved with only negligibly enlarged pore diameter.

(c) Magnetic force lines layer

If a plastics material compound containing ferro- or paramagnetic particles is subjected to such a magnetic field that the force lines are at right angles to the membrane surface, the particles are aligned under constriction to capillary structures. If the magnetic field remains during the setting operation, the particles are thus retained in position.

Figure 8:
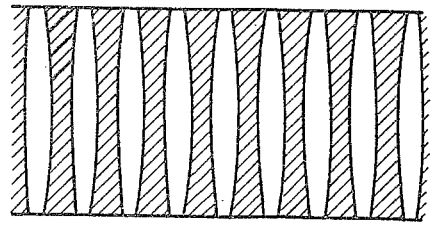
FIG. 8 is a section of a membrane produced in accordance with an alternative embodiment of the method of the invention.

With iron or nickel wire particles coarse-pores are created, but such are particularly smooth-walled structures (FIG. 8).

(d) Electrostatic field lines layer

If a thin layer of a conductive plastics material solution is connected to a high tension source, then oppositely charged glass fibre particles may be deposited (flocked) and later, when the plastics material has set, be then etched out. This method produces relatively coarse, but substantially uniform size, smooth capillaries.

Finely pored, uniform and smooth-walled capillary membranes are obtained if hollow fibre flock is used instead of glass fibre flock. In this case it is even unnecessary to expose the capillaries by etching. A condition is that high molecular weight polymers are used as the polymer material which, on account of their size, are unable to penetrate into the hollow fibre.

The methods for structure formation described herein may also be partly combined, for example, flow etching and spread flow line formation.

EXAMPLE 1

Twenty-two percent by weight pyrogenically obtained silicon dioxide having a maximum grain size of 50 nm are dispersed in 66% by weight cyclohexanone by means of a high-speed agitator, and 12% by weight polyvinyl chloride powder, K-value equal to 70 is then added and homogenised. The paste obtained is strained through a metal wire mesh of a mesh width of 0.06 mm and aerated at 10 millibar vacuum.

The paste is applied with a metal doctor onto a "Teflon" base into a layer of 0.3 mm thickness and left to dry. A flexible silky gloss opaque sheet is obtained which may be peeled off the base without difficulty. The sheet is subsequently extracted for the duration of two hours with a 49% hydrofluoric acid and then rinsed with distilled water. The completed membrane is highly transparent in a wet state and particularly flexible. In the open air it immediately becomes milky opaque. To determine the filtering efficiency the membrane is clamped into a conventional filtering device in front of a sintered metal support plate. It yields at 20° 3.0 cm$^3$/cm$^2$/hour/bar water passage.

Bright red gold sol (particle size=20–24 nm) is quantitatively filtered off. This sol due to its intensive colouring, its defined particle size and the spherical particles is well suited to test the completed membrane. In comparison, this sol passes a conventional so-called ultrafilter on a collodium base having a pore width of 100 nm—substantially unhindered. A 0.01% methylene blue solution having molecular weight of 500 initially is substantially wholly retained; subsequently the coloring breaks through.

EXAMPLE 2

Flow Etching

The membrane produced in accordance with Example 1 is thoroughly washed for an hour at 20° with a 10% aqueous chromium solution. Subsequently, a further wash is effected with distilled water and the filtration efficiency determined. Passing the membrane now are 5.2–5.5 cm$^3$/cm$^2$/hour/bar at 20°.

The behaviour relative to the gold sol and methylene blue solution remains unchanged in comparison with Example 1.

EXAMPLE 3

Flow Lines Formation

Polyvinyl chloride paste produced in accordance with Example 1 is applied to a conventional polyethylene sinter plate having a width of pores equal to; 0.04 mm, and the excess is completely scraped off with a metal doctor. The cavities adjacent to the surface are thereby completely filled with paste. The backing plate is subsequently dried, and the doctor operation is repeated three more times. For checking for imperviousness the carrier plate is tested before etching in the filtering device with a methylene blue solution. In order to permit the penetration depth of the paste to be checked better it is advisable to previously mix it with a little pigment dye (e.g. copper-phthalocycanine blue).

Subsequently, as prescribed, the pores are exposed by etching with a 40% hydrofluoric acid for two hours. The carrier layer is now ready for use and comprises a backing layer of 2 mm thickness of porous polyethylene and a fine filtration layer firmly anchored on one side of from 0.04 to 0.07 mm thickness. The surface of the fine filtration layer comprises from 50 to 60% of dense polyethylene particles and from 50 to 40% of the actual filter composition. Its filtration efficiency with distilled water at 20° amounts to 6.3–6.7 cm$^3$/cm$^2$/hour/bar. Bright red gold sol is completely filtered off.

EXAMPLE 4

Magnetic Force Lines Layer

Conventional nickel powder is suspended in toluene, and a fraction of from 3–4 micrometers particle size is separated by sedimentation. The separated fraction is dried and used for the subsequent experiment.

Twelve grams of henoxy resin, having a molecular weight of 20,000 is dissolved in 52 g N,N'dimethyl formamide and 36 g of the above nickel powder is dispersed therein and a layer of 0.4 mm thickness of the resulting composition is applied with a doctor to a "Teflon" plate, and the Teflon Plate immediately is applied to the end face of a permanent bar magnet of 40 mm diameter and approximately 1.3 tesla.

The layer is left to dry for 5 hours at 50°, after which it is peeled off the base and the nickel particles are removed from the membrane by etching for 4 hours with 20% hydrofluoric acid which contains a substantially 10% concentration of hydrogen peroxide. A turbid sheet of 0.08 mm thickness is obtained. Under the microscope the sheet shows passages leading out toward the surface in the glass-like basic composition. The filtration efficiency of this membrane is from 60 to 70 cm$^3$/cm$^2$/hour/bar. Gold sol completely passes through this membrane. A 1% polyvinyl acetate dispersion having a particle size of 0.5–2 micrometer is completely retained, yielding a so-called "blank" filtrate.

EXAMPLE 5

Capillary Force Lines Layer

Convention nickel wire of 40 micrometer thickness is worked up to a fibrous powder with an average 0.3 mm staple length.

One gram of phenoxy resin, having a molecular weight of 20,000 is dissolved in 5 g N,N' dimethyl formamide, and 1 g of the above nickel wire particles are dispersed therein.

A layer of 0.4 mm thickness of this composition is applied with a doctor to a "Teflon" plate.

Immediately after this operation the layer is applied against the end face of the aforesaid bar magnet (whereby the particles assume an upright position) and allowed to dry at 50° for several hours. The silk-light sheet so obtained is peeled off the base and freed first by pickling with 20% chromic acid from the outer polymer layer. Subsequently, as described above the particle proportion is removed with hydrofluoric acid and hydrogen peroxide. The passage efficiency was substantially 50,000 cm$^3$/cm$^2$/hour/bar.

EXAMPLE 6

Electrostatically Formed Capillary Layer

Conventional quartz fibres of 5 micrometer thickness are converted into a fibrous form of about 0.5 mm staple length. A layer of 0.4 mm thickness of a 20% solution of polyphenyl sulphones in N,N'-dimethyl formamide is applied to a hard chromium plated metal disc of 50 mm diameter. The particles are charged with a suitable device into the polymer solution located on the hard chromium plated disc at 30,000 volt potential difference.

Drying is subsequently effected with an infra-red device.

The silk-like layer is readily separated from the metal plate by insertion in water containing a wetting agent. After two hours of action of the 40% hydrofluoric acid solution the pores are completely exposed. The membrane under the microscope shows perfectly uniform, equal size pores having a meniscus shaped collar. A passage efficiency of substantially 1,200 cm³/cm²/hour/bar was obtained.

EXAMPLE 7

Electrostatically Formed Hollow Fibre Layer

The starting material for hollow fibres is a borosilicate glass tube of 7 mm external diameter and 0.4 mm internal diameter used for the manufacture of so-called solid glass thermometers. The tube is inserted vertically suspended in a ceramic tube of 20 mm internal diameter and 150 mm length heated to 1,400° and drawn off downwards by means of squeeze rollers as an endless hollow fibre. It is relatively easy to obtain fibres having a constant cross-section of 25 micrometers and an inside width of about 1.5 micrometers.

The fibers are converted into a hollow fibre powder of about 0.5 mm staple length. This powder is stored in a thin layer isotherm in a desiccator at 80° over a high boiling kerosene fraction. The capillaries are thus filled with kerosene and during the subsequent flocking operation are not blocked by the polymer solution.

The hollow fibre powder is charged electrostatically as described in Example 6 into a 25% phenoxy resin solution in dimethyl formamide (layer of 0.4 mm thickness), dried, tempered at 90° for several hours and then the capillary orifices are exposed by pickling with 20% chromic acid. There is obtained a silky bright sheet of approximately 0.15 mm thickness having upright intercalated capillaries having an approximate length of 0.5 mm. The flow efficiency is about 350 cm³/cm²/hour/bar.

The membrane may be heat sterilised at about 150° without the flow behaviour being changed thereby.

Suitable particles are pyrogenically obtained silicon dioxide aluminium dioxide, titanium dioxide, or zinc oxide and aqueously precipitated particles of aluminium hydroxide, beryllium hydroxide or zirconium hydroxide, having grain sizes of from 7 nm of 50 nm.

Useful magnetisable particles may be formed of magnetite, iron sulfide, iron oxide, chromite and iron-nickel-cobalt-metal or of Heusler's alloys.

As polymer materials there may be used preliminary stages of epoxy resins, acrylic resins, phenolformaldehyde resins, silicon resins, polyester resins and the polymeric polyvinyl chloride (PVC) polyvinyl hydrofluoric acid (PVDF), polyacrylonitrile (PAN), polyacrylonitrile co-polymers, polyamide, phenoxy resins and polyphenyl sulphones. The membrane made in accordance with the aforesaid method may have any optional form, i.e. it may be formed, for example, as a flat layer or tubular or cup-shaped.

What is claimed:

1. A method for production of a micro-porous membrane comprising the steps of:
    mixing a quantity of finely divided particulate material into a fluid, membrane-forming polymer material; said particulate material being insoluble in said polymer material;
    forming the particle-containing fluid polymer material into a thin layer and aligning the particles in said layer substantially normal to the surface of said layer while said polymer material is in the fluid state;
    solidifying said layer containing the aligned particles to form an aligned particle containing membrane; and
    extracting particles from the aligned particle containing membrane without destroying the membrane to produce a micro-porous membrane having aligned pores substantially normal to the surface of the membrane.

2. The method of claim 1 wherein the particle containing fluid polymer material is applied to a porous support member by means of a doctor to form the polymer material to a thin layer and align the particles substantially normal to the surface of said layer; the pores of said support member being coarser than the pores to be produced in the microporous membrane.

3. The method of claim 1 wherein said particles are of magnetic material, and the alignment of said particles is effected by subjecting the magnetic particle containing fluid polymer layer to a magnetic field.

4. The method of claim 1 wherein said particles are electrically charged and the alignment of the particles is effected by subjecting the charged particle containing polymer layer to an electrostatic field.

5. The method of claim 1 wherein the particles are pyrolytically obtained particles selected from the group consisting of silicon dioxide, aluminum oxide, titanium oxide and zinc oxide.

6. The method of claim 2 wherein the magnetic particles are selected from the group consisting of magnetite, iron sulphide, iron oxide, chromite, iron, nickel, chromium oxide and iron-nickle-cobalt alloys.

7. The method of claim 6 wherein said particles are selected from the group consisting of finely divided iron wire and finely divided nickel wire.

8. The method of claim 4 wherein said particles comprise finely divided glass fibers.

9. The method of claim 8 wherein said particles comprise finely divided hollow glass fibers.

10. The method of claim 4 wherein said particles comprise finely divided quartz particles.

11. The method of claim 1 wherein said particles are precipitated from aqueous medium and comprise a material selected from the group consisting of aluminum hydroxide, beryllium hydroxide and zirconium hydroxide.

12. The method of claim 1 wherein said particles have a grain size from about 7 nm to about 50 nm.

13. The method of claim 1 wherein said polymer material comprises at least one material selected from the group consisting of epoxy resins, acrylic resins, phenolformaldehyde resins, silicon resins, polyester resins, polyvinyl chloride, polyvinylidene fluoride, polyacrylonitrile, polyacrylonitrileopolymers, polyamides, phenoxy resins and polyphenyl sulphones.

14. The method of claim 1 wherein said particle-containing fluid polymer material is formed into a thin layer on a porous support member, the pores of said support member being coarser than the pores to be produced in the microporous membrane.

15. The method of claim 1 wherein said extraction is effected by contacting the aligned particle containing membrane with a substance which dissolves the particles.

* * * * *